(12) United States Patent
Wong

(10) Patent No.: US 7,039,223 B2
(45) Date of Patent: May 2, 2006

(54) AUTHENTICATION METHOD UTILIZING A SEQUENCE OF LINEAR PARTIAL FINGERPRINT SIGNATURES SELECTED BY A PERSONAL CODE

(76) Inventor: Jacob Y. Wong, 7110 Georgetown Rd., Goleta, CA (US) 93117

( * ) Notice: Subject to any disclaimer, the term of this patent is extended or adjusted under 35 U.S.C. 154(b) by 505 days.

(21) Appl. No.: 10/074,011

(22) Filed: Feb. 14, 2002

(65) Prior Publication Data

US 2003/0152253 A1    Aug. 14, 2003

(51) Int. Cl.
*G06K 9/00* (2006.01)
(52) U.S. Cl. .................. 382/124; 356/71; 340/5.83; 902/3
(58) Field of Classification Search ............... 382/115, 382/116, 124–27; 356/71
See application file for complete search history.

(56) References Cited

U.S. PATENT DOCUMENTS

| | | | | |
|---|---|---|---|---|
| 5,363,453 A | * | 11/1994 | Gagne et al. | 382/125 |
| 6,393,139 B1 | * | 5/2002 | Lin et al. | 382/124 |
| 6,459,804 B1 | * | 10/2002 | Mainguet | 382/124 |
| 6,483,932 B1 | * | 11/2002 | Martinez et al. | 382/124 |

* cited by examiner

*Primary Examiner*—Samir Ahmed
*Assistant Examiner*—Charles Kim

(57) ABSTRACT

A method and system for personal authentication using sequences of partial fingerprint signatures provides a high security capability to various processes requiring positive identification of individuals. In a baseline usage, the sequential partial fingerprint sequence techniques augments sentinel systems for gaining access to restricted areas, and when used in combination with financial cards, offer a unique and greatly simplified means for authenticating or identifying individuals. A highly automated technique initially obtains eight (illustratively) linear partial fingerprint signatures which serve as reference data against which later proffered candidate data in the form of at least two linear partial fingerprint signatures are compared for authentication. The particular two candidate signatures used and the sequence in which they are submitted are selected with the user's consent and serve as a PIN-like unique personal code. The use of only partial fingerprint data greatly allays the concerns of widespread fingerprint dissemination by many individuals.

6 Claims, 4 Drawing Sheets

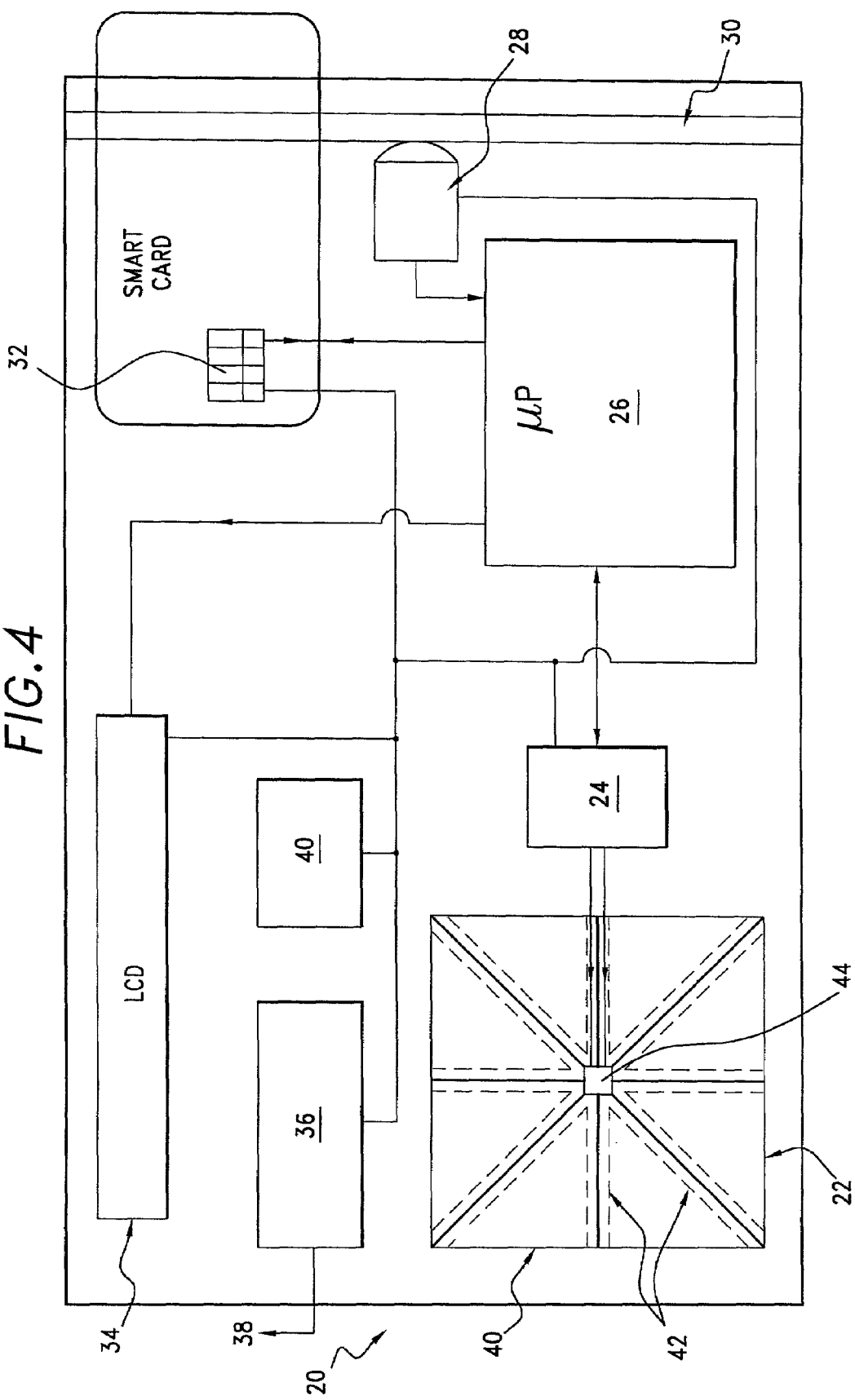

AUTHENTICATION METHOD UTILIZING A SEQUENCE OF LINEAR PARTIAL FINGERPRINT SIGNATURES SELECTED BY A PERSONAL CODE

TECHNICAL FIELD

The present invention relates generally to the field of personal authentication. In particular, this invention pertains to a comparison method of utilizing a specific sequence of an individual's linear partial fingerprint signatures selected by a Personal Code as a basis of comparison for the authentication or identification of the individual in question.

BACKGROUND

In the complex society we are living in today, there are numerous occasions where individuals have to authenticate themselves by means other than personal recognition. Until recently, a common approach to this has been the issuance of personal identification cards which range in complexity depending on the purpose for which they are to be used. For situations that are deemed only of secondary importance, the cards may merely contain the individual's name, signature and an identification number. Here, the presentation of the card will be proof enough of the user's identity if the card signature matches that of the user's as taken at the time of use. For situations that require a more positive identification, such cards are also provided with the individual's photograph, as in the case of driver's licenses and passports.

Unfortunately, these identification instruments have commonly become the victims of illegal falsification and duplication. The rampant credit card fraud of recent years has certainly accentuated the inadequacy of using such personal instruments to authenticate oneself in many instances. To this end when bank-issued ATM cards were finally accepted and used by the American public in large numbers in the middle 1980's, a new identification means was introduced via what is now called the PIN number or Personal Identification Number which takes the form of an easily-memorisable 4-digit decimal number.

Even though there exist superior ways and methods for use in identifying or authenticating an individual, particularly those that use a person's natural body codes such as fingerprints, retina patterns and vocal audiograms or waveforms, they have to date only been deployed in highly special circumstances where the absolute security of one's identity warrants the additional complexity. Indeed the use of fingerprints to identify unique individuals has been around for well over a hundred years. Either "rolled" fingerprint or "flatly placed" fingerprint inked impressions are commonly used and the identification can be classified as "passive" because the individual is not required to perform any finger motions during the subsequent process of identification. As is well known, in collecting the so-called "rolled" fingerprint impressions, an individual's inked thumb or other fingers is rotated from one side to the other so that the entire pattern area can be printed on paper. Characteristic features or patterns of fingerprints such as "arches", "loops" and "whorls" (referred to as "keys") are routinely employed by fingerprint-identifying technicians to define fingerprint patterns for easier comparison and identification of them. The so-called Henry classification system is often used to determine if two prints are the same even though this system requires a skilled expert to compare the individual characteristics of the prints.

The classical approach of using fingerprints to identify individuals, albeit among one of the best known to date, is nevertheless rather complex and may require elaborate optical instruments such as high-power microscopes for detailed fingerprint pattern examinations. Collection of inked fingerprint impressions can be rather messy and also takes operator skill and a finite amount of time in order to do an adequate job. As briefly stated above, identification of fingerprints belonging to unique individuals using comparison methods requires trained expert or experienced technicians. Furthermore identification of individuals via fingerprint matching is not really an exact science and is by no means 100% objective or accurate. Added to all these is the fact that an individual's fingerprints are not even safe or fully protected from fraudulent use because most people frequently and inadvertently leave behind fingerprints while performing their daily routines. These fingerprints can be willfully recovered for illegal use as falsified personal identifications.

Not surprisingly, not all people feel comfortable in submitting their fingerprints for their personal identification such as credit cards, employee entrance cards in workplaces etc. except for very serious matters such as an extreme security check for sensitive federal appointments or for crime solving. One important reason behind this is the fact that there is an undesirable stigma of "criminal nature" associated with the use of fingerprints as a method of identification. Replacing specially trained and experienced fingerprint-identifying technicians requires the use of very complicated detection machines equipped with a complex processing algorithm. These equipments are therefore necessarily expensive. Still, in an effort to try to thwart the rampant credit card fraud, proposals have been advanced over the past several years to utilize one's fingerprint as a more secure way of authenticating credit card holders. The use of fingerprints along with the use of the so-called "smart cards", namely cards that encapsulate a secure smart integrated circuit (IC) chip in the plastic in lieu of the fraud-prone magnetic stripe for storing sensitive and personal financial data, would surely eliminate once and for all the credit card fraud problem existing today. The development of the so-called biometric smart card using fingerprint template identification has been on-going for a number of years but unfortunately is still far from being a reality because of the credit card size and cost constraints of this method in addition to having to overcome very difficult technical challenges.

However, the technical obstacles that have been encountered to date in the implementation of the full-blown fingerprint identification approach in the biometric smart card should not be the determining factor in deciding whether or not this venerable identification method should be deployed in the future. Furthermore, the deployment of the retina pattern and the vocal audiogram or waveform as better and alternate ways to identify individuals will likely encounter the same constraint problems in size, cost and technical challenges without the benefit of a head start like the use of fingerprints. Today the rampant credit card fraud problem has not gone away. As a matter of fact, the problem grows worse and more serious every day that passes. Thus there presently exist ample reasons why a new and better methodology is needed in order to exploit the use of fingerprints as a secure way of authenticating individuals, especially in circumstances of primary importance like access to restricted area or restricted information, or authorization of credit cards, without the existing encumbrances of using fingerprints for identification as discussed above.

Ample prior art can be found in fingerprint detection apparatus and methods of using fingerprints for personal authentication and identification. Most of the prior art, with the exception of a few, deals only with two-dimensional fingerprint images, their acquisition methodology and apparatus, and their classification, interpretation and comparison as summarized below.

In U.S. Pat. No. 3,584,958 issued to Miller et al. in 1968, an identification system for identifying an individual using only a pre-defined and coded partial fingerprint, and not its entire 2-dimensional image, as a basis for comparison was advanced. The known information about the individual is contained as a coded partial fingerprint record in the form of an identification card issued to the individual. Similarly coded partial fingerprint record is generated for the individual at the time of identification by a complicated electro-optical-mechanical machine. The newly generated record is compared with the stored one looking for sufficient matching between them using an optical/photographic contrasting technique in order to establish authenticity. Although this invention teaches the use of only a partial fingerprint of an individual as a basis of comparison and thus simplifies somewhat the traditional approach of employing the entire 2-dimensional image of the fingerprint, the apparatus advanced is extremely complicated and the time required to make an identification easily takes more than a minute, and the individual has no personal choice in which portion of the fingerprint forms the basis of comparison for authentication.

In U.S. Pat. No. 4,003,656 issued to Leventhal in 1977, a method and apparatus for rapidly scanning the finger of an individual with a monochromatic beam of light and for producing an output in accordance with the light reflected by the finger which corresponds to the fingerprint of the finger was advanced. This teaching deals with the expeditious procurement of 2-dimensional fingerprint image for comparison with a stored reference. This method is classified as "passive" and the individual to be authenticated has no personal choice in the use of his fingerprint data (partial or complete) during the authentication process.

In U.S. Pat. No. 4,582,985 issued to Lofberg in 1986, the inventor advanced an identification system in the form of a credit card-shaped data carrier which contains a microprocessor capable of a priori storing and comparing supplied personal data of the individual at the time of authentication in order to enunciate a true or false decision. The sensor device comprises an array of micro-sensors arranged in the shape of a sensing matrix. The sensing elements can be thermo-resistive (a thermister having a temperature-dependent resistance) or thermo-electrical (thermocouple). The function of this sensing matrix is to determine the topographic contour (ridges and valleys) of a fingertip in intimate contact with it via differential temperature sensing, thereby obtaining a corresponding fingerprint line information. This invention deals only in 2-dimensional fingerprint images converted into digital data format for comparison with similar a priori stored fingerprint data of the individual to be identified.

In U.S. Pat. No. 4,607,384 issued to Brooks in 1986 an arrangement for generating a classification code for a fingerprint was advanced. For a fingerprint having a pattern of ridges and a plurality of reference features, a pair of cross-hairs is overlaid at a first one of the reference features. A line is then overlaid from a second one of the reference features to the first reference feature. The cross-hairs are oriented so that the line bisects a quadrant of the cross-hairs. The ridges crossed by predetermined portions of the cross-hairs are counted to generate the classification code. The overall objective of this invention is to provide an improved fingerprint classification arrangement in which fewer fingerprints are likely to have the same descriptor codes and deals with only 2-dimensional fingerprint images.

U.S. Pat. No. 4,784,484 issued to Jensen et al. in 1988 discloses an apparatus for the automatic scanning of a fingerprint comprising a scanning surface with a measuring means for the rate of movement of the finger in relation to the scanning surface. The apparatus further comprises a scanning area, a lighting means, an optical system and an electrical/optical scanning means giving an electrical signal as a function of the fingerprint when the finger is moved in contact with the scanning surface in a predetermined direction. The scanning is undertaken along a scanning line which is imaged onto a linear array of point-sized photodiodes coupled electrically to both a control and an output circuit for generating a line image of the fingerprint for the moving finger. The subsequent digital measurements can be stored in a dedicated memory which holds up to 256 lines of 256x1 digitized linear photodiode outputs equivalent to a complete fingerprint scan.

Additional teachings of fingerprint identification systems and methods of related interest may be found in other U.S. patents, including—U.S. Pat. No. 6,097,035 issued to Belongie et al. in 2000; U.S. Pat. No. 6,241,288 B1 issued to Bergenek et al. in 2001; U.S. Pat. No. 6,259,108 B1 issued to Antonelli in 2001; and Pub. 2001/0026636 A1 issued to Mainguet in 2001.

There is little doubt that the prior inventions summarized above have made significant progress towards simplifying the overall mechanics for the acquisition, classification and comparison of fingerprints. They have also removed in some cases the subjectivity and ambiguity in the employment of the well-known Henry classification system to determine if two prints are the same. However, as will be described in more detail below, the prior art of fingerprint detection/comparison apparatus and methods, including the use of automatic scanning of fingerprints, partial fingerprint images, fingerprint-reading systems and new classification arrangements, still fail to achieve the needed and valued objectives of overall simplicity, unusually high security, low cost and other new capabilities required for this identification technique to be fully functional, expeditious and more importantly, readily accepted by the general public for much wider application and usage in the future.

OBJECTS AND SUMMARY OF THE INVENTION

It is therefore a primary object of the present invention to provide improved methods and apparatus for verifying or authenticating the identity of individuals using only partial fingerprint data.

A further object of the present invention is to provide improved high security methods and systems for personal authentication or identification using sequences of linear partial fingerprint signatures selected by a personal code.

A still further object of the present invention is to provide a method of verifying or authentication the identity of individuals using a sequence of at least two linear partial fingerprint signatures taken from a group of more than two linear signatures where the particular two used as well as the particular sequence in which they are used is arranged to constitute a PIN-like user's personal code.

A still further object of the present invention is to provide a system for obtaining and processing a reference set of linear partial fingerprint signatures from an individual and a candidate set of at least two linear partial fingerprint signatures from that individual to authenticate the individual's identity.

Additional objects of the present invention are: to advance a method for simplifying the use of one's fingerprint to authenticate one's identity; to facilitate the replacement of specially trained and experienced fingerprint-identifying technicians with relatively simple, ultra-small-sized and low-cost device that can be manufactured in high volumes and thereby renders the task of fingerprint authentication simpler, less costly and less subjective to personal opinion; and to safeguard the use of fingerprints to identify individuals from the illegal recovery of fingerprints and their subsequent fraudulent use.

Although the present invention uses an individual's basic fingerprint as a means to authenticate their identity (authentication and identification are hereinafter used substantially interchangeably), it departs significantly from the manner of traditional fingerprint utilization. Instead of using the entire inked impression of fingerprints—rolled or flat—and its associated characteristic features or patterns such as "arches", "loops" and "whorls" for identification purposes, only certain pre-defined segments of the fingerprint or "partial fingerprints" are used. The number of such partial fingerprints used in the present authentication methodology is not directly tied to the efficacy or accuracy of this technique, nevertheless at least two need to be used in order to assure a sufficient accuracy of authentication.

Fingerprints are also commonly used to identify escaped criminals or missing persons when the fingerprints of these individuals are known or have been collected and classified earlier. In some rarer situations, fingerprints are also used to identify or authenticate key individuals or employees in the workplace because of the extreme security requirement of these individuals performing their work. In this situation, the individuals voluntarily have their fingerprints a priori collected and classified by the responsible parties for use in their subsequent authentication or identification.

The situations presented above using fingerprints to identify or authenticate individuals can be classified arbitrarily as "non-selective". By that is meant that once the fingerprints of the individuals have been collected and classified, there is no need for the individuals to make any decision in the authentication process or it is no longer up to them to make any decision before they can be identified or authenticated using their fingerprint data. Even though for authentication cases, the individual has to subject his or her thumb print for scanning prior to validation, it is always the same thumb print that he or she has to use without any freedom of choice.

It is because of this rigidity or no-choice requirement, at least for authentication cases, that opens up the possibility that individual's identity using fingerprints could be falsified. In other words, once one's fingerprints are illegally obtained by a third party, it is possible for the third party to imitate the identity of the individual by producing the same fingerprint data. This is a very serious drawback in using fingerprints for authenticating individuals due to the fact that most people inadvertently leave behind fingerprints while performing their daily routines. These fingerprints can be targeted for willful recovery and subsequently used for falsified personal identification.

The present invention overcomes this serious drawback with the use of multiple partial fingerprints and the incorporation of one's own choice in selecting which partial fingerprints are to be used for their authentication or identification. This is likened to remembering a PIN number but instead of punching in the traditional 4-digit PIN, one replaces that with two simple and sequential "strokes" of his or her index finger on a well-marked platen. It is the choice of any two out of eight possible "strokes" and their respective sequence that in essence replaces the use of the PIN.

In order to simplify the use of the elaborate 2-dimensional image of a complete fingerprint for the purpose of authentication or identification, the present invention uses a predetermined and well-defined collection of partial fingerprints designated herein as "linear signatures". These "linear signatures" represent different linear (straight line) image scans of the ridges and valleys of a fingerprint all through its reference center. Unlike the prior art presented above, these defined linear signatures are not generated via the use of a linear array of sensors which is costly and whose outputs are rather complex to process. Instead, only a single sensor located at the reference center of the fingerprint is used. Every linear signature is generated by moving the finger (fingerprint side down) across the single sensor located at the center of the fingerprint. Thus the present invention, in addition to advancing the method of using only one's selected partial fingerprints for authentication, thereby giving the individual a PIN-like protection, also simplifies the procurement of the so-called "linear signatures" with the use of only one sensor located strategically at the reference center of the fingerprint in question.

BRIEF DESCRIPTIONS OF THE DRAWINGS

Additional objects and advantages of the invention will become apparent to those skilled in the art as the description proceeds with reference to the accompanying drawings wherein:

FIG. 4 is a simplified block diagram for the Selective Partial-fingerprint Authenticator (SPA) according to the present invention, FIG. 5 schematically shows details of the fingerprint sensor unit;

BEST MODE FOR CARRYING OUT THE INVENTION

Figure 1:
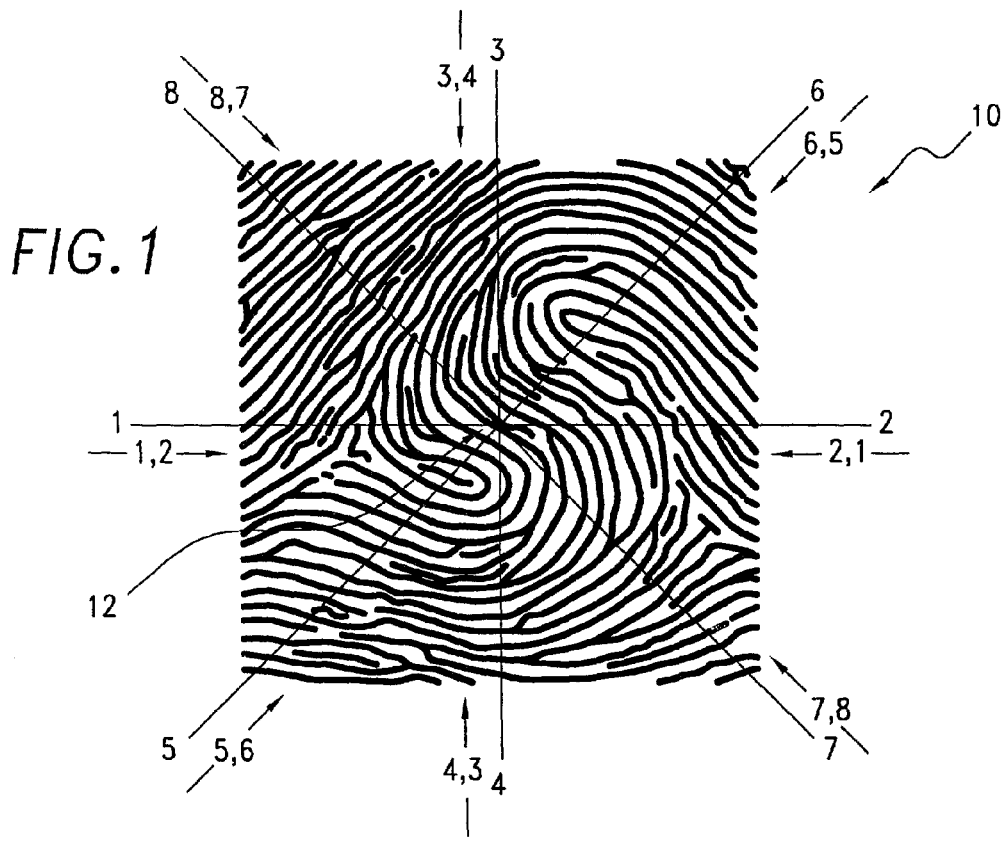
FIG. 1 depicts eight linear signatures and their respective scanning directions as superimposed over a typical fingerprint central portion.

Instead of using the entire inked impression of fingerprints and their associated characteristic keys for identification purposes, the current invention employs a total of eight straight-line linear signatures all crossing the nominal reference center of the fingerprint being processed. Referring to FIG. 1 there is shown a typical fingerprint central portion 10 over which are superimposed four straight lines which intersect at their midpoints to produce what are defined as eight lineal signature paths. A nominal fingerprint reference center 12 identifies the intersection point of the lines.

A horizontal line 1-2 running from West to East shows the path for taking a lineal signature designated as 1,2, as depicted by the arrow 1,2 (e.g. the path which originates at the western terminus 1 of the line 1-2 and ends at its eastern terminus 2). The same horizontal line 1-2 shows the path for taking a lineal signature designated as 2,1, as depicted by the arrow 2,1. Clearly, this second lineal signature 2,1 will produce the same fingerprint data as the previous lineal signature 1,2, but in inverse order. Similarly, a vertical line 3-4 running from North to South shows the path for taking a lineal signature designated as 3,4, as depicted by the arrow 3,4 (e.g. again the path which originates at the northern terminus 3 of the line 3-4 and ends at its southern terminus 4). And, the same vertical line 3-4 shows the path for taking a lineal signature designated 4,3 as depicted by the arrow 4,3. Also as before, this lineal signature 4,3 will produce the same fingerprint data as the previous lineal signature 3,4 but in inverse order.

In like manner, an angled line 5-6 running from Southwest to Northeast shows the path for taking a lineal signature 5,6 as depicted by the arrow 5,6; and the same line 5-6 shows the Northeast to Southwest path for taking a lineal signature designated 6,5 (with inverted order data), as depicted by the arrow 6,5. Finally, an angled line 7-8 running from Southeast to Northwest shows the path for taking a lineal signature 7,8 as depicted by the arrow 7,8; and the same line 7-8 shows the Northwest to Southeast path for taking a lineal signature designated 8,7 (with inverted order data), as depicted by the arrow 8,7.

Alternately stated, the four (illustratively) lines 1-2, 3-4, 5-6 and 7-8, when displaced 45 degrees (illustratively) apart and arranged to centrally intersect give rise to eight possible orientations or lineal signature designations. When any two of these eight are selected in a particular sequence (by the individual being authenticated, for example), a total of 64 possible combinations are available resulting in a unique PIN-like capability. This is accomplished even while using only partial fingerprint data, which in itself is an additional security level capability.

Figure 2:
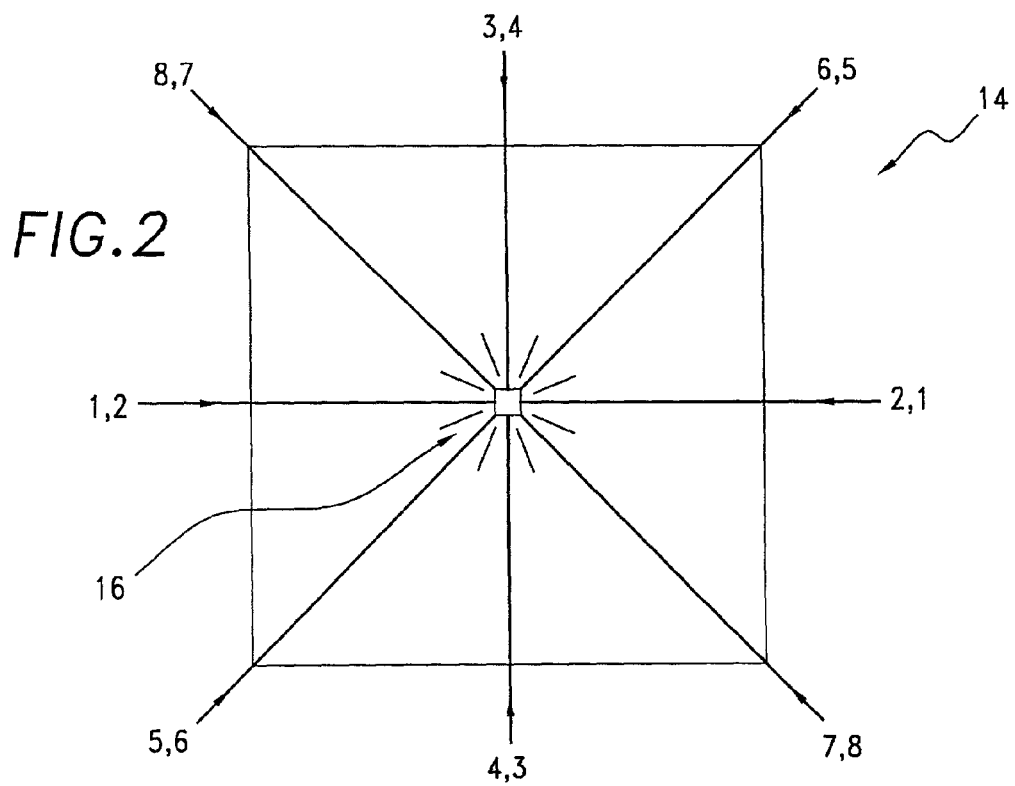
FIG. 2 depicts a simplified identification template device with the eight linear signature scanning directions well delineated, and a single sensor element at the center of the template.

Referring now to FIG. 2 there is shown a simplified representation of an identification template device 14 showing the eight lineal signatures and their scanning directions, as well as a centrally located single sensor element 16 at the template center. The present invention encompasses the storage of the eight linear signatures for an individual's fingerprint (thumb or any finger) as uniquely belonging to that individual. In a preferred embodiment, it is contemplated that the index finger be used and that a right-handed person uses their right index finger and a left-handed person uses their left index finger. However, in order to uniquely identify that individual, one only uses two out of the sixty-four possible combination of two linear signatures in a sequence as selected by that individual (and/or an associated entity) for their identification or authentication. These two so-selected sequential linear signatures are referred to as the individual's "Personal Code".

Figure 3:
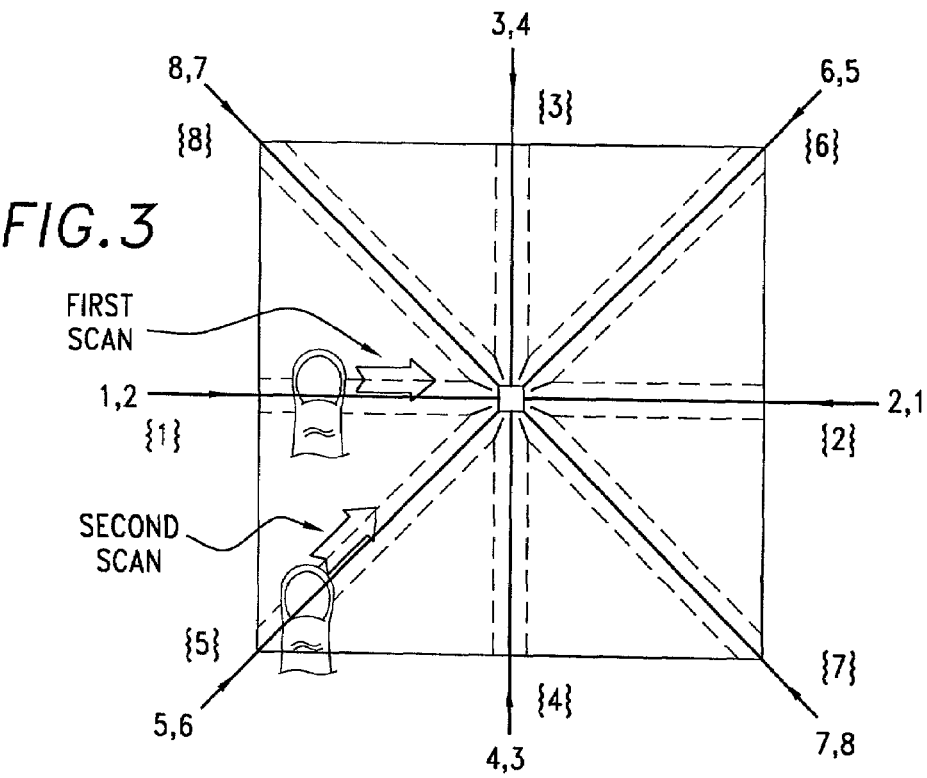
FIG. 3 depicts the scanning motion for a finger of an individual having a Personal Code {15}.

In order to represent an individual's Personal Code in a more user-friendly manner, simply as a two digit number, one translates the linear signatures as previously described with the assistance of and reference to FIG. 3. Thus if one's Personal Code is selected as 1,2 and 3,4 (e.g. first West to East, then North to South) the two-digit code will simply be {13} or thirteen. And if one's Personal Code is selected as 1,2 and 1,2 (e.g. West to East twice), then the two digit code will be {11} or eleven, and so on. Each single digit in brackets corresponds to what was described above as the starting terminus of the straight line, and two digits in brackets represents the unambiguous and simplified designation sequence of the two number Personal Code. The authentication methodology of the current invention calls for an individual to first indicate his Personal Code and the subsequent authentication of that individual is based only upon the use and comparison of these two selected sequence linear signatures with the corresponding sequential two that had been previously stored. For clarity, the authentication process is illustrated in FIG. 3 for a Personal Code of {15}, fifteen. Note that the first of the two sequential scans {1} is from West to East, the second scan {5} is from Southwest to Northeast, and that shallow indentations, shown in dashed lines surrounding each track or path, help guide finger movement. Note also that the finger must always point upwards (to the North) as shown. The sixty-four two-digit Personal Codes available are—using the bracket scheme described above: {11-18}, {21-28}, {31-38}, {41-48}, {51-58}, {61-68}, {71-78} and {81-88}.

The present invention is in essence a two-step process. Step one involves the generation and storage of a set of eight non-inked partial fingerprint data for an individual in the form of eight linear signatures 1,2, 2,1, 3,4, 4,3, 5,6, 6,5, 7,8 and 8,7 previously designated and described, or their simplified equivalents {1} through {8} respectively, as shown in FIG. 3. These are considered as the reference lineal signatures. This step may be likened to obtaining an individual's a priori inked fingerprint impressions in the traditional sense but without the use of ink, and of course, using only partial fingerprint data.

Step two involves the actual taking and processing of two sequential non-inked linear partial fingerprint signatures of an individual according to his supplied Personal Code (these are considered as the candidate lineal signatures), for comparison with the corresponding two sequential linear signatures of the eight that were stored, at the time of the authentication process. Step two will typically be carried out at a point-of-sale terminal, ATM, or other authentication venue. The authentication is affirmative if there is deemed sufficient match between the two sets of reference and candidate sequential linear signatures, and the pending transaction is approved for completion. Otherwise the authentication is negative, and the proposed transaction is denied.

It is evident from the description above that step one of the two processes entailed in the current invention can be afforded a rather sophisticated measurement setup without too much concern about cost and size constraints. This measurement equipment could be designed to scan linearly (in a substantially straight line) with known spatial scanning speed in four different directions all passing through a well-defined fingerprint reference center, the lines each separated by an angle of 45 degrees. Since four of the eight linear signatures are basically the same data except for scanning in the opposite directions, only four such directional scans suffice to generate the eight linear signatures with the individual's index finger held stationary and its center coincident with the reference center of the scanning surface (template) of the equipment. The scanning speed information is needed for the subsequent pro-rating in time of the relevant stored linear signatures in order to match those generated by the individual at the time of authentication or identification. Such a pro-rating of the scanning speed in time by the appropriate software installed in the processor of the hardware for generating the linear signatures of the individual at the time of authentication eliminates the finger motion speed dependence on the generated linear signatures.

Step two of the process for implementing the present invention is accomplished by a Selective Partial-fingerprint Authenticator (SPA) device that will procure or generate two candidate linear signatures of the individual corresponding to his entered Personal Code at the time of authentication. The SPA device also holds the eight reference linear signatures and other relevant information of the individual to be authenticated. Furthermore the SPA holds a microprocessor installed with appropriate software for processing the generated authentication information (here the two candidate linear signatures) during an authentication process in order to generate an acceptance signal based upon the result of a sufficiently positive match. In principle such an SPA device may take many forms with varied complexity dependent upon the purpose or application for which it is to serve. In any event this device cannot afford the type of sophistication and luxury installed in the measurement equipment used in step one of the process where only a few equipments would suffice to generate all the reference linear signatures needed for use with this invention.

One of the ideal applications for the present invention is a security device employed along with an ordinary non-secure card to simply identify an individual (name and ID number of an individual only) for security purposes so as to control access to a restricted area or restricted information. One example is to authenticate workers entering their workplaces. Here using the non-secure identification card (either in the form of a magnetic card or a smart card) the worker indicates who he or she is and then he has to provide his linear signatures according to his Personal Code submitted earlier to his employer in order to gain access to the workplace. Another more relevant and opportune application is to authenticate workers at airports getting access to restricted areas in view of the country's heightened security concern.

For these specific applications, the SPA device suitable for use in step two of the two-step process is shown in block diagram form in FIG. 4. The blocks of an SPA device as depicted include a scanning device 22, a sensor driver/signal preprocessor circuit 24, a microprocessor 26 complete with its CPU, ROM, RAM and I/O units, a magnetic reader head 28 with the slider track 30, a smart card contact receptor 32 or an RF receiver (optional and not shown), an LCD indicator 34, a power supply circuit 36 with external AC cord 38 and a battery 40 for standby power in the event of a power failure. Not shown in FIG. 4 is an output from the microprocessor 26 to an external control unit which could be wired or wireless (e.g. via RF) in order to perform a specific function such as the unlatching of a lock in addition to the "positive authentication" indicated by the LCD indicator 34.

With the exception of scanning device 22 and the sensor driver/signal pre-processor unit 24, the rest of the building blocks in the SPA 20 are straightforward and well known to those skilled in the arts pertaining to the present invention. Therefore, the details of operational interactions between the microprocessor 26, its output display LCD 34, its smart card input receptacle 32 and power sources 36 and 40, etc. are not described further in the interests of brevity, other than to note that the processed representation of the linear partial fingerprint sequences (both reference and candidate) may be stored in the ROM and/or RAM portions of the microprocessor 26. The scanning device 22 further comprises a template 40 with four sets of slightly indented scanning tracks, of which tracks 42 are typical, and a sensor unit 44 located at the center of the template 40. (The design for the template 40 and its associated scan tracks 42 corresponds to the features depicted more generally in connection with the description of FIGS. 2 and 3). Thus the sensor unit 44 is located at the fingerprint center as previously shown. The four sets of scanning tracks 42 correspond to the scanning directions 1,2, 3,4, 5,6, and 7,8 of FIG. 2. The dashed lines surrounding the tracks 42 additionally indicate that the tracks have an operational width set so as to alleviate finger alignment problems during authentication as well as to mitigate software requirements.

Figure 5:
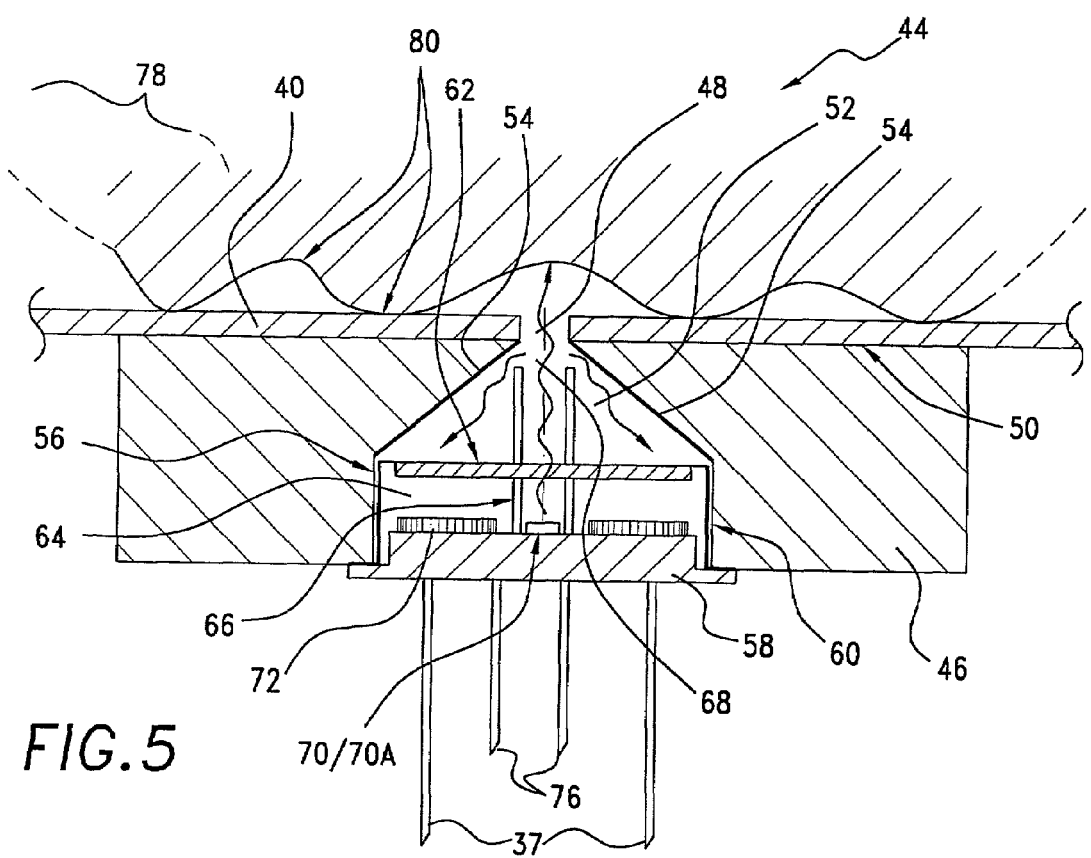

The structural and functional details of the sensor unit 44 are described with reference now to FIG. 5. The sensor unit 44 comprises a special fixture (or slab), 46 with a very small aperture 48 on its top surface 50 and a conical cavity 52 with optically opaque surface 54. The conical cavity 52 opens up at its bottom 56 to accommodate a small header 58 (e.g. TO-18) equipped with a specially designed header can 60 which serves to hermetically seal the devices (LED and silicon photodiode) die-attached onto the top surface of the header 58. The header can 60 is equipped with a thin transparent window 62 made out of quartz or sapphire for optical radiation to pass into and out of a space 64 formed between the top surface of the header 58 and the bottom side of the header can 60. The header can 60 is further equipped with an small aperture tube 66 on its top so as to provide an aperture stop 68 for the radiation emitted by a light-emitting-diode (LED) 70. Die-attached onto the top of the header 58 are the LED 70 and a ring or donut-shaped silicon photodiode 72 encircling the LED 70. Electrical leads 74 of the silicon photodiode 72 are connected to the signal pre-processor portion of the circuit 24 (of FIG. 4) and the electrical leads 76 of the LED 70 are connected to the sensor driver portion of circuit 24. Also shown in FIG. 5 is the previously described template 40 being butted against by the top 50 of the slab 46 with the bottom side of an individual's finger 78 showing the ridges and valleys, of which the two shown as 80 are typical, in touch with the other side of the template 40.

Figure 6:
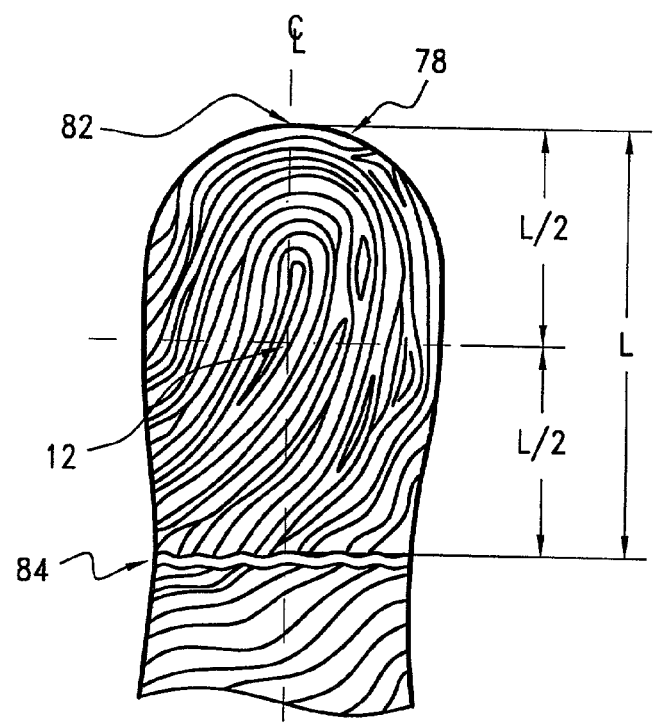
FIG. 6 depicts the defining of the fingerprint reference center of the bottom side of an individual's finger.

The sensor unit 44 is used to procure linear signatures for the individual when his finger (bottom side down) moves along any one of the eight possible scanning tracks 42 at the time of authentication. The so-called fingerprint reference center (12 of FIG. 1) is ideally placed in the center of the indented track as the finger moves along the desired track. With brief reference to FIG. 6, the so-called fingerprint reference center is defined vertically (from North to South) as the midpoint between an apex 82 and the first "break" 84 of the prints, and laterally (East to West) as the midpoint of the finger 78.

Figure 7:
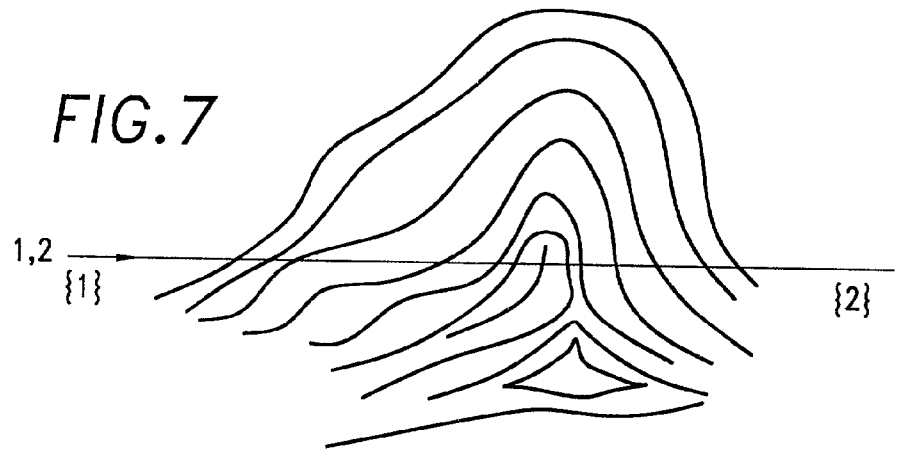
FIG. 7 shows a typical fingerprint ridge and valley pattern in simplified form having an illustrative scanned direction 1,2 or {1}.
Figure 8:
FIG. 8 depicts the linear signature data, in analog form, as sensed by a fingerprint sensor unit of FIG. 5 corresponding to the scanned direction of FIG. 7.

As the finger 78 moves across the indented track as was described in connection with FIG. 3, over the top aperture 48 of the slab 46, chopped (e.g. at a frequency of 3.03 kHz) and quasi-collimated radiation emanating from the LED 70 (as driven by driver circuit 24) through the apertures 48 and 68 will illuminate the bottom contour of the finger 78. The use of a specifically chopped radiation is needed in order to suppress the influence of stray background radiation from the ambient surroundings and greatly improves the signal-to-noise (S/N) performance of the sensor unit 44. The reflected radiation will be detected by the annular silicon photodiode 72 located beneath the aperture 48. The amount of reflected chopped radiation received by the photodiode 72 in essence will map out the topographical contour of the fingerprint with the ridges reflecting more light and the valleys less. FIG. 7 shows a typical ridge and valley pattern of a fingerprint along a typical scanned direction 1,2 (for example) with the concomitant linear signature produced in (analog form) developed by the sensor unit 44 and processed by circuit 24, shown in FIG. 8.

In addition to providing the appropriate driving pulses of a particular designed frequency to the LED 70, the circuit 24 of the SPA 20 (of FIG. 4) serves to process the received signal waveform from the photodiode 72 with different well-known algorithms in order to label the linear signature with special characteristics for easier comparison with the stored signatures. One such algorithm, for example, is simply to differentiate (taking the first derivative of) the incoming analog waveform and then characterize the temporal zero-crossing characteristics of the resulting waveform. It is anticipated that different linear signatures will exhibit widely different temporal zero-crossing characteristics so that the task of comparing them would be rendered much easier. Other algorithms are also possible to use for those skillful in the art of performing quantitative fingerprint analysis.

Assuming that a particular individual has a priori their eight linear signatures taken and their Personal Code duly selected and provided to the proper authorities, as for example his employer, then in operation of having his identity subsequently authenticated, he has to first provide his identity (name or ID number) to the SPA 20 via the use of a magnetic card using slot 30, or a smart card. He then waits for the ready signal from the SPA 20 through the latter's LCD indicator 34 to scan his finger according to his Personal Code. The rest of the operation is self-contained and carried out by the SPA 20 without further intervention by the individual. A successful authentication of the individual will first be indicated in the LCD indicator 34 followed by appropriate functions to be performed by the security sentinel unit such as the unlatching of a lock, the opening of a gate, and the like.

In addition to the application as a security sentinel described above, the present invention has numerous other applications primarily in the security industry. These include locks of all kinds such as door locks, automobile locks, safes, etc. But one of the most promising applications is in the realization of the so-called biometric smart card discussed previously in the prior art section. In order to accomplish this here-to-forth unrealized capability, all the components contained in the SPA 20 with the exception of the magnetic reader head and smart card receptacle, are incorporated in the confines of a regular-sized credit card.

This is readily accomplished by replacing the sensor driver/signal pre-processor circuit 24 and the microprocessor 26 with the circuitry of the smart chip which is already resident in the smart card. The smart chip now takes over the functions of both the sensor driver/signal pre-processor 24 and the microprocessor 26. Alternatively, a MEMS-based ASIC chip needed to combine the components of the sensor unit 44 may also include the functions of the sensor driver/signal-processor circuit 24. The power supply circuit 36 and the battery unit 40 are replaced with the latest super-thin Power Paper Cell battery which could be easily incorporated within the size and thickness of an ordinary credit card.

Finally the LCD 34 indicator's function is replaced with an LED 70A (of FIG. 5) in the sensor unit 44 without altering the original illumination capability. The LED 70 is converted from a one-color device into a three-color LED device 70A. The first color (red) is used as a blinking light at a very slow frequency like 0.33 Hz or once every three seconds. By a user simply blocking this blinking red LED light momentarily, this LED 70A will turn into a steady yellow indicating that the card is ready to accept linear signatures from the individual according to their Personal Code. This can be done because as the blinking red LED is blocked, the silicon photodiode will receive a sizable signal due to the reflected light. If the submission of the linear signatures by the individual according to his own Personal Code is accepted by the card, then the LED 70A will turn steady green indicating that the holder of the biometric smart card has been authenticated and the smart card could now be accepted for financial (credit, debit, etc.) and other transactions. If the linear signatures are not accepted, the LED will turn back into blinking red again prompting the cardholder to repeat the authentication process. Three unsuccessful submission of linear signatures will make the LED steady red and the biometric smart card will no longer be valid until reset by the issuer.

Although the invention has been described in terms of a preferred and selected alternate embodiments, the invention should not be deemed limited thereto since other embodiments and modifications will readily occur to one skilled on the art. It is therefore to be understood that the appended claims are intended to cover all such modifications as fall within the true spirit and scope of the invention.

What is claimed is:

1. A method of authenticating the identity of an individual employing a preselected sequence of linear partial fingerprint signatures comprising the steps of:
   (a) obtaining a reference set of linear partial fingerprint signatures and storing an electronic representation of the reference set in a comparison means, said reference set derived from two or more scans taken across predetermined paths on an individual's fingerprint;
   (b) generating a candidate set of linear partial fingerprint signatures and applying an electronic representation of the candidate set to a comparison means, said candidate set derived from at least two scans taken across corresponding predetermined paths on that individual's fingerprint, the particular two of said at least two scans and the sequence of their application to said comparison means being selected so as to serve as a personal code; and
   (c) providing a comparison means for comparing said reference and candidate sets and for providing an affirmative response for a successful comparison and a negative response for an unsuccessful comparison;
   wherein said reference set is derived from four bidirectional scans.

2. The method of claim 1 wherein said four bidirectional scans are taken along straight lines intersecting at their midpoints, each line rotationally displaced 45 degrees from any closest other line.

3. The method of claim 2 wherein said reference set includes eight linear partial fingerprint signatures and said candidate set includes two out of a possible sixty-four linear partial fingerprint signatures.

4. The method of claim 1 wherein said comparing means is included in a microprocessor embedded within an identification/credit card.

5. The method of claim 1 wherein said affirmative response is one or more responses selected from a group including an alphanumeric visual indicator, a color-coded visual indicator and a signal for controlling an external control unit.

6. A system for authenticating the identity of an individual employing a preselected sequence of linear partial fingerprint signatures comprising:
   (a) means for obtaining a reference set of linear partial fingerprint signatures and for storing an electronic representation thereof is a comparison means, said reference set derived from two or more scans taken across predetermined paths on an individual's fingerprint;

(b) means for generating a candidate set of linear partial fingerprint signatures and for applying an electronic representation of the candidate set to a comparison means, said candidate set derived from at least two scans taken across corresponding predetermined paths on that individual's fingerprint, the particular two of said at least two scans and the sequence of their application to said comparison means being selected so as to serve as a personal code; and (c) a comparison means for comparing said reference and candidate sets and for providing an affirmative response for a successful comparison and a negative response for an unsuccessful comparison;

wherein said means for obtaining includes an optical scanner for deriving four bidirectional scans while said individual's fingerprint is held stationary.

* * * * *